(12) United States Patent
Recouvreur et al.

(10) Patent No.: US 10,439,259 B2
(45) Date of Patent: Oct. 8, 2019

(54) METHOD FOR MANAGING A HYBRID POWER TRAIN OF A MOTOR VEHICLE

(71) Applicant: RENAULT s.a.s., Boulogne-Billancourt (FR)

(72) Inventors: Philippe Recouvreur, Montrouge (FR); Caroline Marchal, Paris (FR); Elise Jean, Cachan (FR); Irina Marincas, Paris (FR)

(73) Assignee: RENAULT s.a.s., Boulogne-Billancourt (FR)

(*) Notice: Subject to any disclaimer, the term of this patent is extended or adjusted under 35 U.S.C. 154(b) by 76 days.

(21) Appl. No.: 15/536,007

(22) PCT Filed: Dec. 10, 2015

(86) PCT No.: PCT/FR2015/053411
§ 371 (c)(1),
(2) Date: Jun. 14, 2017

(87) PCT Pub. No.: WO2016/097541
PCT Pub. Date: Jun. 23, 2016

(65) Prior Publication Data
US 2017/0365891 A1    Dec. 21, 2017

(30) Foreign Application Priority Data

Dec. 16, 2014 (FR) .................. 14 62487

(51) Int. Cl.
*H01M 10/615* (2014.01)
*H01M 10/625* (2014.01)
(Continued)

(52) U.S. Cl.
CPC ......... *H01M 10/615* (2015.04); *B60L 50/16* (2019.02); *B60L 58/12* (2019.02); *B60L 58/25* (2019.02);
(Continued)

(58) Field of Classification Search
CPC .... B60L 58/24; B60L 58/27; F02D 2200/021; F02D 2200/22023
(Continued)

(56) References Cited

U.S. PATENT DOCUMENTS 6,118,252 A * 9/2000 Richter .............. G01R 31/3647
320/132
2001/0040061 A1   11/2001 Matuda et al.
(Continued)

FOREIGN PATENT DOCUMENTS

| | | |
|---|---|---|
| EP | 1 065 354 A2 | 1/2001 |
| EP | 2 366 598 A1 | 9/2011 |
| GB | 2509308 A | 7/2014 |

OTHER PUBLICATIONS

International Search Report dated Mar. 10, 2016 in PCT/FR2015/053411 filed Dec. 10, 2015.
(Continued)

*Primary Examiner* — Steven B McAllister
*Assistant Examiner* — John E Bargero
(74) *Attorney, Agent, or Firm* — Oblon, McClelland, Maier & Neustadt, L.L.P.

(57) ABSTRACT

A method manages a power train of a motor vehicle including a heat engine and an electric motor electrically linked to a power battery. The method includes controlling a heating system for heating the power battery according to at least one measurement of a temperature representative of an operation of the heat engine.

11 Claims, 4 Drawing Sheets

(51) Int. Cl.
*H01M 10/63* (2014.01)
*H01M 10/663* (2014.01)
*H01M 10/6571* (2014.01)
*H01M 10/61* (2014.01)
*H01M 10/651* (2014.01)
*B60W 20/13* (2016.01)
*B60L 50/16* (2019.01)
*B60L 58/12* (2019.01)
*B60L 58/25* (2019.01)
*B60L 58/27* (2019.01)

(52) U.S. Cl.
CPC ............ *B60L 58/27* (2019.02); *B60W 20/13* (2016.01); *H01M 10/61* (2015.04); *H01M 10/625* (2015.04); *H01M 10/63* (2015.04); *H01M 10/651* (2015.04); *H01M 10/6571* (2015.04); *H01M 10/663* (2015.04); *B60L 2240/445* (2013.01); *B60L 2240/545* (2013.01); *B60L 2240/80* (2013.01); *B60Y 2200/92* (2013.01); *H01M 2220/20* (2013.01); *Y02T 10/70* (2013.01); *Y02T 10/7005* (2013.01); *Y02T 10/705* (2013.01); *Y02T 10/7044* (2013.01); *Y02T 10/7077* (2013.01)

(58) Field of Classification Search
USPC .......................................................... 237/2 A
See application file for complete search history.

(56) References Cited

U.S. PATENT DOCUMENTS

| | | | |
|---|---|---|---|
| 2004/0069546 A1* | 4/2004 | Lou | B60K 6/22 180/65.21 |
| 2010/0258063 A1 | 10/2010 | Thompson | |
| 2011/0270481 A1* | 11/2011 | Koga | B60L 1/003 701/22 |
| 2011/0288708 A1 | 11/2011 | Katono et al. | |
| 2013/0111932 A1* | 5/2013 | Mishima | F25B 29/00 62/79 |

OTHER PUBLICATIONS

French Search Report dated Aug. 12, 2015 in FR 1462487 filed Dec. 16, 2014.

\* cited by examiner

METHOD FOR MANAGING A HYBRID POWER TRAIN OF A MOTOR VEHICLE

TECHNICAL FIELD OF THE INVENTION

The invention relates to the field of motor vehicles of hybrid type, that is to say with heat and electrical motor drive.

The subject of the invention is more particularly a method for managing a power train of a motor vehicle comprising a heat engine and an electric motor electrically linked to a power battery.

STATE OF THE ART

In the field of hybrid motor vehicles, that is to say equipped with a heat engine and an electric motor powered by a battery, and both intended to propel the motor vehicle, it is known that the temperature of the battery influences the performance levels of said battery.

Thus, when the battery is cold, there will be an effort to heat it up to optimize its performance levels.

The document EP1065354 describes a heat exchanger recovering the heat lost by the heat engine to transfer it to the battery. The result thereof is that the temperature rise of the battery is totally and passively slaved to the temperature rise of the heat engine, without any control.

However, such a solution notably does not take account of the type of driving of the driver and involves a constant heat exchange limited to an input of calories only linked to the heat lost.

OBJECT OF THE INVENTION

The aim of the present invention is to propose a solution which remedies the drawbacks listed above.

This aim is targeted particularly in that the method comprises a step of controlling a heating system for heating the power battery according to at least one measurement of a temperature representative of the operation of the heat engine.

In particular, the heat engine being associated with a first optimal operating temperature and the power battery being associated with a second optimal operating temperature, the control step is such that it synchronizes the temperature rise of the power battery with the temperature rise of the heat engine for the first and second optimal operating temperatures to be reached at the same time.

According to one embodiment, the method comprises, for each step of measurement of the temperature representative of the operation of the heat engine, a step of generation of a setpoint temperature, and the step of controlling the heating system comprises a step of activation of the heating system to make the real temperature of the power battery tend toward the generated setpoint temperature, notably if the real temperature of the battery is lower than the setpoint temperature.

In particular, the control step comprises a step of measurement of the current temperature of the power battery and a step of determination of a heating power of the heating system to be applied according to the generated setpoint temperature and the measured current temperature of the power battery.

For example, each measurement of the temperature representative of the operation of the heat engine includes measuring the temperature of the coolant of the heat engine.

According to one embodiment, the step of controlling the heating system of the power battery comprises a step of taking calories from a member of the motor vehicle producing heat because of the operation of the heat engine and a step of restoration of at least a part of the calories taken to the power battery.

For example, the step of taking calories and the step of restoration of said at least a part of the calories use a thermal coupling element linking said heat-producing member to the power battery.

Furthermore, the step of controlling the heating system of the power battery can comprise a step of charging or discharging the power battery to provoke, by Joule effect, the reheating thereof.

Furthermore, the step of controlling the heating system of the power battery can comprise an activation of resistive means internal to the power battery.

The invention also relates to a motor vehicle comprising a power train comprising a heat engine and an electric motor linked electrically to a power battery, said vehicle comprising a heating system for heating the power battery, and a module for controlling the heating system configured so as to control said heating system according to at least one measurement of a temperature representative of the operation of the heat engine.

In particular, the control module can comprise the elements necessary to the implementation of the method as described.

BRIEF DESCRIPTION OF THE DRAWINGS

Other advantages and features will emerge more clearly form the following description of particular embodiments of the invention given as nonlimiting examples and represented in the attached drawings, in which.

DESCRIPTION OF PREFERRED EMBODIMENTS OF THE INVENTION

The method described hereinbelow differs in particular form the prior art in that there will be an effort to determine a temperature representative of the operation of the heat engine (also called temperature representative of the temperature of the heat engine) and that this temperature determined, notably by measurement, will influence the strategy for reheating the power battery of the electric motor.

The heat engine participates in propelling the motor vehicle based on the use of a fuel such as diesel or petrol. The electric motor participates in propelling the motor vehicle based on the use of a power battery of the electric motor.

The method which will be described hereinbelow applies most particularly to a hybrid motor vehicle in a phase following startup in which the heat engine and the electric motor have not yet reached optimal operating temperatures.

In the present description, "propulsion of the motor vehicle" should be understood by a definition in the broad sense, that is to say the input of energy to a motor vehicle to allow it to move. In this sense, the propulsion covers a rear-wheel drive vehicle and/or a front-wheel drive vehicle.

Figure 1:
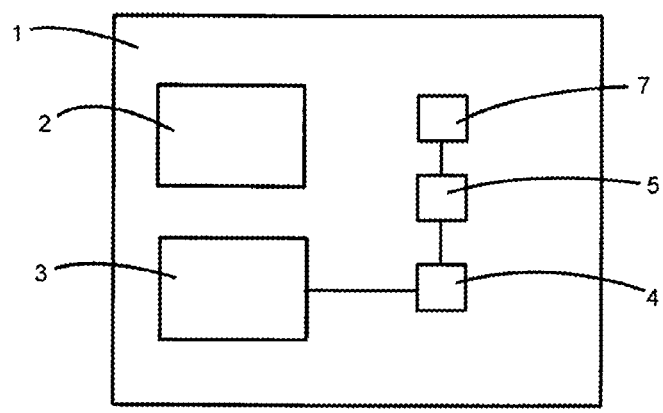
FIG. 1 is a schematic view of the different components used in the context of a mode of execution of the management method.

As illustrated in FIG. 1, the invention relates most particularly to a method for managing a power train 1 of a motor vehicle comprising a heat engine 2 and an electric motor 3 electrically linked to a power battery 4. In other words, the power battery 4 makes it possible to operate the electric motor 3 such that the latter provides a torque to wheels of the motor vehicle.

The management method comprises a step of controlling a heating system 5 of the power battery 4 according to at least one measurement of a temperature representative of the operation of the heat engine 2.

According to a particular embodiment, the heat engine 2 is associated with a first optimal operating temperature and the power battery 4 is associated with a second optimal operating temperature. In this context, the control step is such that it synchronizes the temperature rise of the power battery 4 with the temperature rise of the heat engine 2 for the first and second optimal operating temperatures to be reached at the same time.

The first and second optimal operating temperatures are preferentially different. In particular, the first optimal operating temperature is lower than the second optimal operating temperature.

In fact, the temperature rise of the heat engine 3 is automatic because of its operation. Thus, the management method makes it possible to control the temperature rise of the power battery 4 according to that of the heat engine 2.

Figure 2:
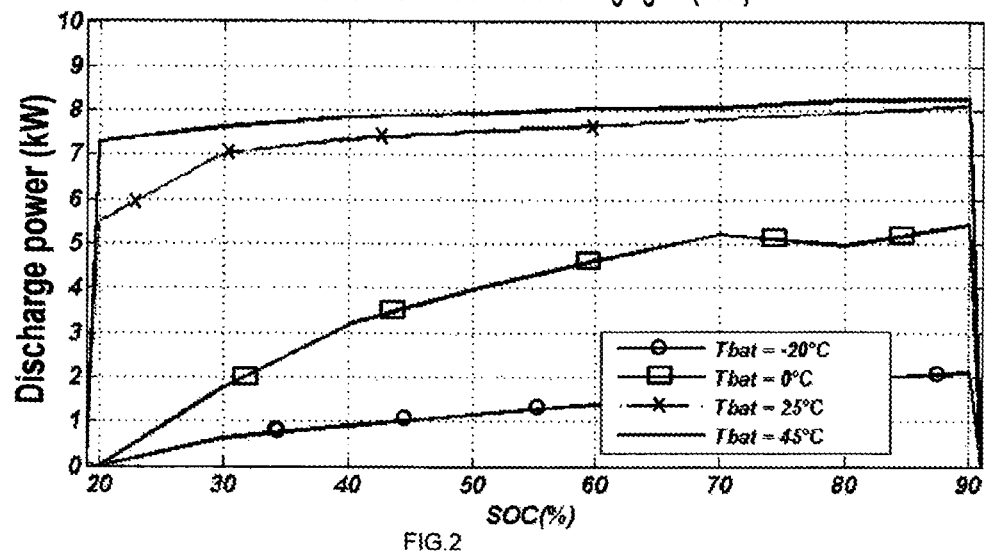
FIG. 2 represents a graph giving the discharge power in kW as a function of the state of charge (SOC) of a power battery of a motor vehicle electric motor according to its temperature Tbat, FIG. 3 gives the trend of a setpoint temperature $T_{setpoint}$ of the power battery as a function of the temperature representative of the temperature of the heat engine, here $T_{water}$.

The importance of a suitable temperature rise of a power battery 4 of the heat engine 3 is understood from studying FIG. 2. In effect, it can be seen that the higher the temperature of the power battery 4 rises, for tested temperatures of −20°, 0° C., 25° and 45° C., the greater is the power available at 10 seconds discharge. In this sense, to maximize the input of the electric motor to the driving experience, it is essential for the temperature of the power battery to be matched.

In this sense, such a management method in particular makes it possible to obtain an optimized driving experience by allowing the motor members to arrive at the same time at their optimal operating conditions. Thus, implicitly, account is taken here of the driving mode of the driver, for example chosen between flexible driving and sporty driving. In particular, the temperature rise of the heat engine 2 is generally slow (a few minutes) or even very slow if the driver drives very slowly. It is therefore pointless to heat the power battery 4 too fast if the temperature rise of the heat engine 2 is slow. On the other hand, if the temperature rise of the heat engine 2 is faster (that is to say the driver has a "sporty" driving mode), the temperature rise of the power battery 4 must be accelerated.

Preferably, each measurement of the temperature representative of the operation of the heat engine 2 includes measuring the temperature of the coolant of the heat engine 2. In particular, the temperature of the coolant which is measured at the output of the heat engine 2 offers the advantage of being a good indicator of the temperature of the heat engine 2 itself.

Figure 3:
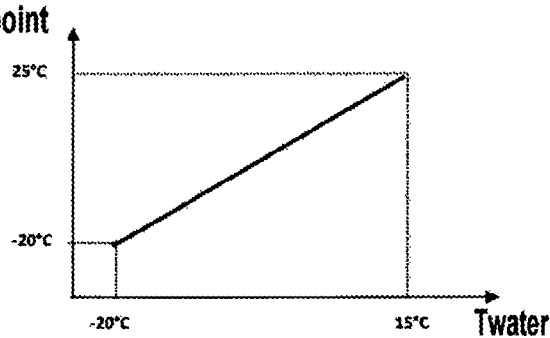

In particular, the management method comprises, for each step of measurement of the temperature representative of the operation of the heat engine 2, a step of generation of a setpoint temperature. For example, for a measured temperature, it is sufficient to look up a table or a function giving the setpoint temperature $T_{setpoint}$ according to the measured temperature $T_{water}$ representative of the heat engine 2. FIG. 3 illustrates such a function. Moreover, the step of controlling the heating system 5 comprises a step of activation of the heating system 5 to make the real temperature of the power battery 4 tend toward the generated setpoint temperature. In particular, the real temperature of the power battery 4 is made to tend toward the setpoint temperature if the real temperature of the battery is lower than the setpoint temperature. It will then be understood that the management method applies more particularly to a motor vehicle after the startup thereof in the heating period.

In a way applicable to all that has been said above, the control step can comprise a step of measurement of the current temperature of the power battery and a step of determination of a heating power of the heating system to be applied according to the generated setpoint temperature and the measured current temperature of the power battery 4. More particularly, by knowing the measured current temperature of the power battery 4 and of the setpoint temperature, it is possible to calculate a desired temperature variation. From the desired temperature variation, and knowing a regulation constant giving a power in relation to degrees Celsius or Kelvin, it is possible to deduce the desired heating power.

Figure 4:
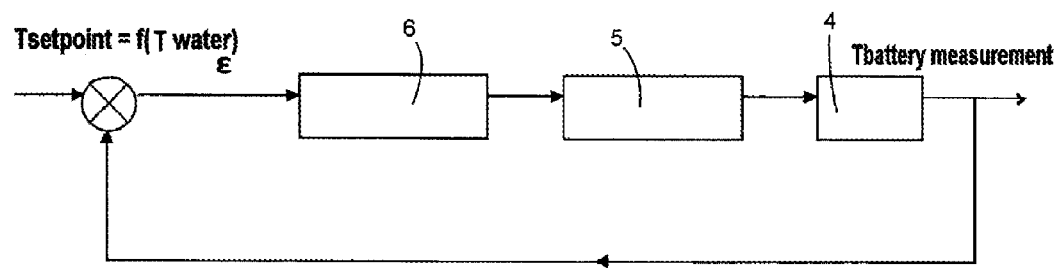
FIG. 4 illustrates the different steps of the management method.

In particular, FIG. 4 schematically illustrates the logic of the management method which takes as input a temperature representative of the operation of the heat engine 2, $T_{water}$ in the example illustrated, and a measured temperature of the power battery 4, $T_{batterymeasurement}$ in the example illustrated. The application of the function f makes it possible to obtain a setpoint temperature $T_{setpoint}$. Then, ε relative to the desired heat input is calculated, notably as follows:

$$E = T_{setpoint} - T_{batterymeasurement}$$

If ε is positive, then a need to heat the power battery is detected, ε is then sent to a regulator 6 which makes it possible to appropriately control the heating power of the heating system 5.

According to a particular example derived from what has been said above, the full power of the power battery 4 is necessary for a hybrid vehicle only when the heat engine 2 is considered hot. For example, the heat engine 2 is considered hot when the temperature of the cooling water at the output of the heat engine 2 is 15° C. The aim is then to synchronize the performance levels of the heat engine and of the electric motor. For that, it is proposed to synchronize the full power temperature of the power battery 4 with the "target" temperature (referred to previously at 15° C.) of the heat engine 2. Thus, when the water temperature at the output of the heat engine 2 exceeds a threshold (example: 15° C.) then the heat engine 2 is considered sufficiently hot to deliver a good portion of its power. In the example, when the motor vehicle starts, the temperature of the cooling water and the temperature of the power battery 4 are identical and equal to −20° C. The heat engine 2 is considered hot as soon as its water temperature becomes higher than 15° C. and the power battery 4 is capable of delivering all its power as soon as its temperature exceeds 25° C.

Figure 5:
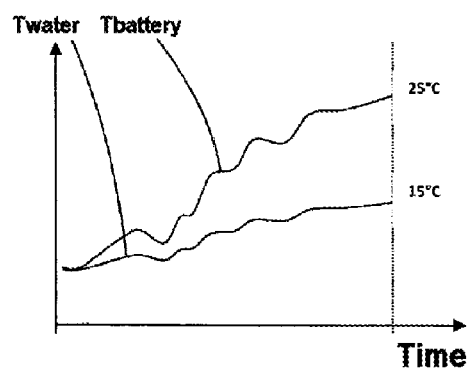
FIGS. 5 and 6 illustrate two temperature rises of the power battery and of the heat engine according to two different driving types as a function of time.
Figure 6:
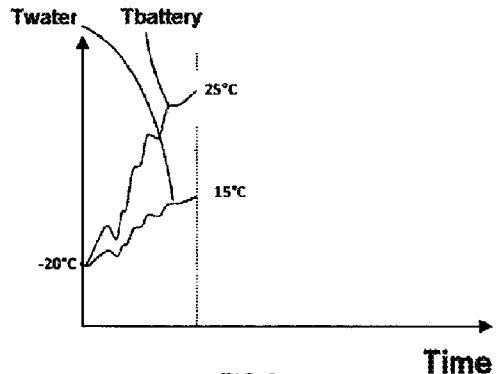

Since the driver, by his or her manner of driving, governs the temperature rise of the heat engine 2, the temperature rise of the power battery 4 is controlled for the latter to reach 25° C. when the heat engine 2 reaches 15° C. It should be noted that that is not possible with the passive control solution of the prior art mentioned previously. FIGS. 5 and 6 illustrate the trend of the temperatures of the cooling water $T_{water}$ and of the power battery 4 $T_{battery}$ according to the implementation of the management method for smooth driving (FIG. 5) in which the optimal temperatures are reached after 20 minutes, and for sporty driving (FIG. 6) in which the optimal temperatures are reached after 7 minutes. In the example, although that is not limiting, it was chosen to apply a linear trend between the temperature rise of the power battery 4 and the temperature rise of the heat engine 2. The graph of FIG. 3 shows this linear trend.

To validate the principle given in the example of application above, it is possible to posit the following equation:

$$M \cdot Cp \cdot \frac{dT_{battery}}{dt} = P_{CTP} + (hS)_{ext} \cdot (T_{ext} - T_{battery}) + RI^2 \quad \text{eq. 1}$$

with $M \cdot Cp \cdot \frac{dT_{battery}}{dt}$ the inertia of the power battery 4, $P_{CTP}$ the heating power supplied by the heating system 5 when it is activated, $(hS)_{ext}$ the heat exchange between the external air and the power battery 4, $T_{ext}$ the outside temperature, $T_{battery}$ the measured temperature of the power battery 4 and $RI^2$ the power by Joule effect in the cycling of the power battery 4 (that is to say the heat that the power battery itself adds by virtue of its operation).

Associated with the initial condition: $T_{battery}(t=0)=20°$ C.$=T_{initial}$, the solution of the equation number 1 is given by:

Without the heating system input, the solution of the equation number 1 (with $P_{PTC}=0$) would have been:

$$T_{battery} = T_{initial} \cdot \exp(-t/\tau) + \left(T_{ext} + \frac{RI^2}{(hS)_{ext}}\right) \cdot (1 - \exp(-t/\tau)) \quad \text{eq. 3}$$

with $\tau = \frac{M \cdot Cp}{(hS)_{ext}}$

It is clear that $\tau$ is a function of the battery type, and therefore adapted accordingly.

The input from the heating ε, notably by PTC (for "Positive Thermal Coefficient"), can for example be a simple resistor, and is therefore the difference between the solution number 1 (temperature without thermal input $T_{battery\_withPTC}$) and the solution number 2 (temperature without thermal input ($T_{battery\_withoutPTC}$):

$$T_{battery\_with\ PTC} - T_{battery\_without\ PTC} = \varepsilon = \left(\frac{P_{PTC}}{(hS)_{ext}}\right) \cdot (1 - \exp(-t/\tau)) \quad \text{eq. 4}$$

ε represents the desired temperature variation mentioned above, that is to say the difference between the measured temperature of the power battery and the assessed setpoint temperature.

Since the power battery 4 reacts slowly, it is pointless to have a fast regulator. In the example of application, we take a regulator time t of 30 s (that means that the heating power needs are reassessed by the heating system every 30 s).

Still in the example of application, we take the following values:

a time constant value τ=619 s
a heat exchange between the external air and the battery: $(hS)_{ext}$=1.319 W/K.

The input from the heating, according to the equation eq. 4 will therefore be $$T_{battery\_with\ PTC} - T_{battery\_without\ PTC} = \left(\frac{P_{PTC}}{(hS)_{ext}}\right) \cdot (1 - \exp(-t/\tau)) =$$

$$\left(\frac{P_{PTC}}{1.319}\right) \cdot (1 - \exp(-30/619)) = P_{PTC} \cdot 0.0358$$

i.e. $= \frac{P_{PTC}}{K_p} == P_{PTC} \cdot 0.0358 = \varepsilon$ with ε as described previously, the difference between the setpoint temperate of the power battery 4 and the current measured temperature of the power battery 4.

The regulation of the heating system 5 implemented by the control step can therefore be placed in the form of a proportional gain $K_p$:

$$P_{PTC} = K_p \cdot \varepsilon$$

with $K_p = \frac{1}{0.0358} = 27.88$ W/K

It is therefore known how, as a function of ε, to control the heating power to be input to the power battery 4 by the heating system 5.

The equations given above can be applied to any type of power batteries in the characterization thereof to find the corresponding value $K_p$.

Figure 7:
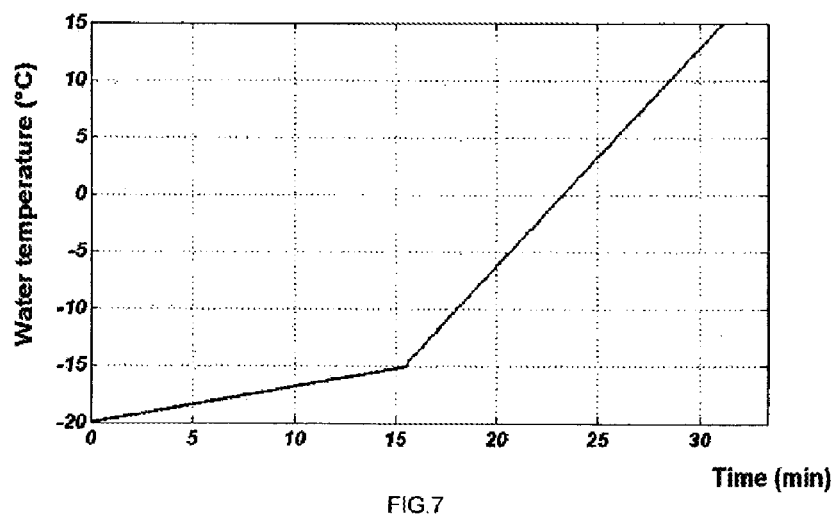
FIG. 7 illustrates an example of the trend of the temperature representative of the temperature of the heat engine (here the temperature of the cooling water of the heat engine) as a function of time following a startup at −20° C.
Figure 8:
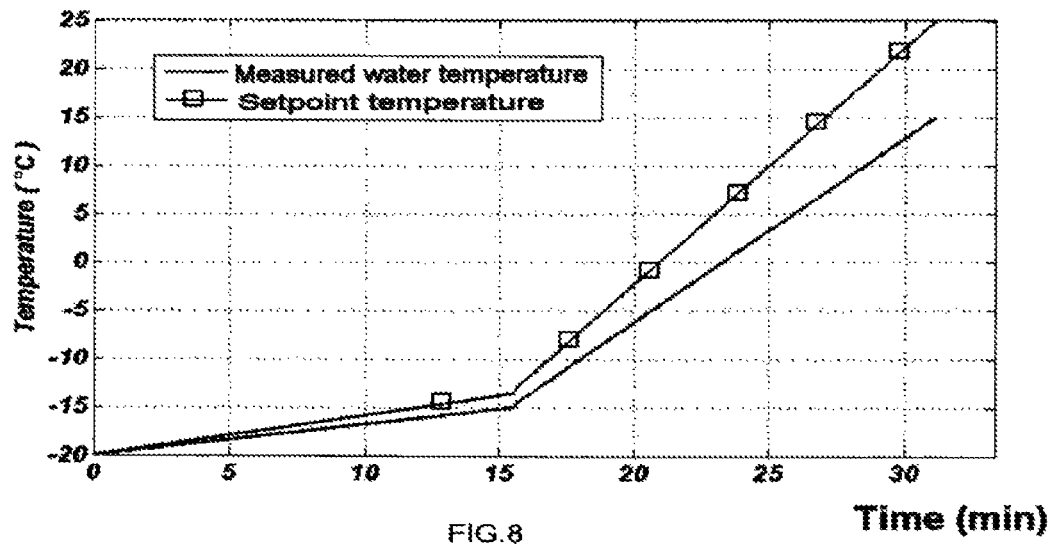
FIG. 8 illustrates, by overlay on FIG. 7, the associated setpoint temperature trend.
Figure 10:
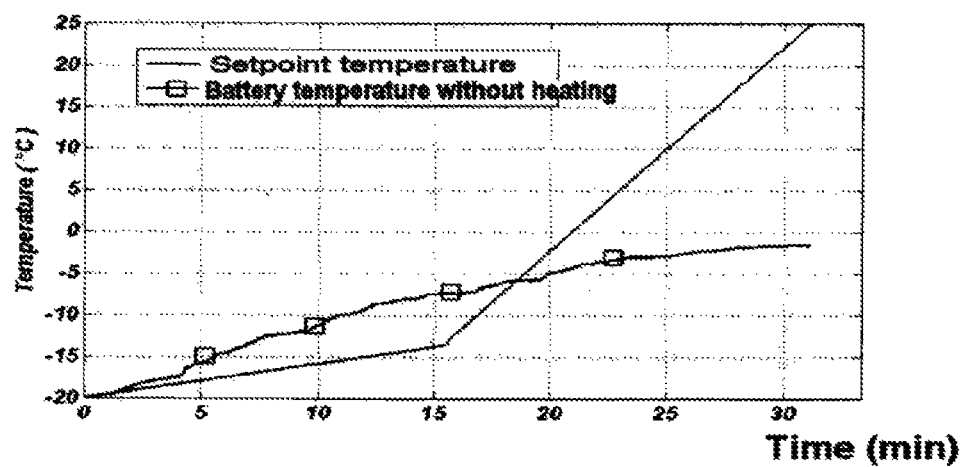
FIG. 10 illustrates the trend of the measured temperature of the power battery overlaid on the trend of the setpoint temperature when the management method is not implemented.
Figure 9:
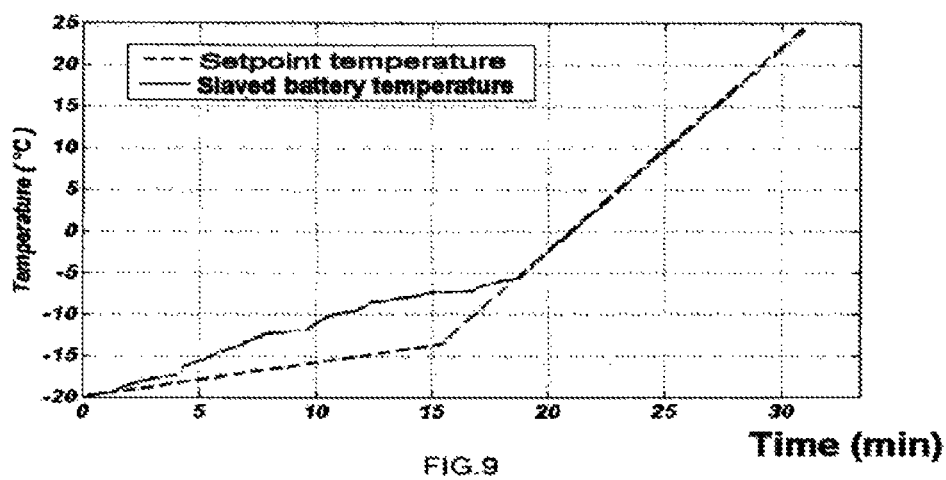
FIG. 9 illustrates the trend of the measured temperature of the power battery, called slaved, overlaid on the trend of the setpoint temperature when the management method is implemented.
Figure 11:
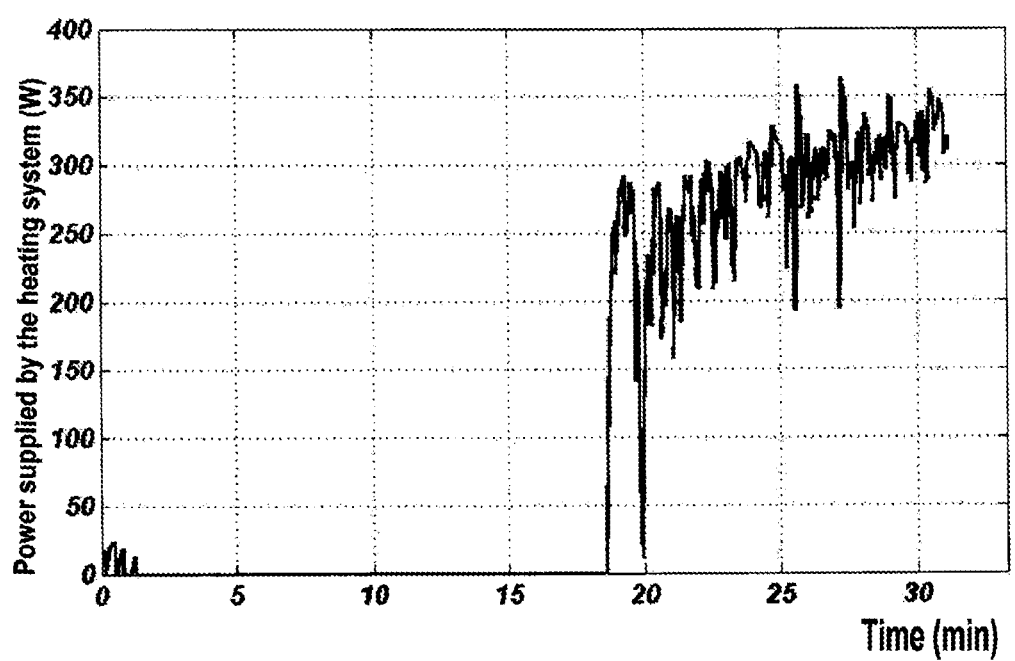
FIG. 11 illustrates, in the context of FIG. 9, the trend of the power supplied by the heating system as a function of time.

A concrete example is now described for which the management method is implemented. FIG. 7 illustrates the influence of the operation of the motor vehicle on the temperature of the water of the heat engine 2 for a period of 30 minutes after startup of the vehicle garaged at −20° C. (the result thereof is that the water of the heat engine is at −20° C. at the time of startup). FIG. 8 illustrates, for the curve of FIG. 7, the trend of the desired setpoint temperature. FIG. 9 shows the trend of the real temperature of the power battery 4 according to the setpoint temperature in the context where the management method is applied, whereas FIG. 10 shows the trend of the real temperature of the power battery when the management method is not applied. The clear result is that, without temperature input, the power battery 4 cannot supply all its power even at the end of a 30-minute running phase. In addition, FIG. 11 illustrates, over time, the input in W of the heating system 5 to make the real temperature of the power battery 4 tend toward that setpoint temperature.

Generally, the step of controlling the heating system 5 of the power battery 4 comprises a step of taking calories from a member of the motor vehicle producing heat because of the operation of the heat engine and a step of restoration of at least a part of the calories taken to the power battery 4. It is obvious that this calorie-taking step is implemented when the generated setpoint temperature is higher than the measured temperature of the power battery 4, in other words when a need to heat the power battery 4 is detected. In particular, the step of taking calories and the step of restoration of said at least a part of the calories use a thermal coupling element linking said heat-producing member to the power battery 4.

Generally, to optimize the operation of the management method, each time a setpoint temperature is generated, a temperature of the power battery 4 is measured to have a view matched to a same time instant.

The member of the motor vehicle producing heat because of the operation of the heat engine can, for example, be chosen from a heat exchanger, a motor vehicle exhaust line, a water circuit particularly in the context of a THP (acronym for "Turbo High Pressure") engine, etc.

Alternatively or in combination with the heat-producing member, the temperature rise of the power battery 4 can be produced by stimulating said power battery 4 (cycles making it possible to increase its internal resistance). In other words, the step of controlling the heating system of the power battery 4 can comprise a step of charging or discharging the power battery 4 to provoke, by Joule effect, the reheating thereof. This use (charging or discharging of the power battery) can be implemented by applying a particular energy management law, for example by deliberately increasing the input of the torque of the electric motor 3 in the context of setting the vehicle in motion to draw from the power battery 4.

Alternatively or in combination with the heat-producing member and/or the stimulation of the power battery 4, the step of controlling the heating system 5 of the power battery 4 comprises an activation of resistive means internal to the power battery 4.

The method described above makes it possible, by linking the temperature rise of the heat engine to that of the battery by measurement(s) of temperature(s) representative of that (those) of the heat engine, to best control the input of calories to the battery according to the use of the vehicle. For example, in case of a short period of use for which the heat engine will remain cold, the temperature rise of the battery will be able to be limited because it is not useful to the driving. In this sense, it is possible to reduce the consumption of the vehicle and therefore to favor the range of the battery powering the electric motor.

The invention of course also relates to a motor vehicle comprising a power train comprising a heat engine 2 and an electric motor linked electrically to a power battery 4, said vehicle comprising a heating system 5 for heating the power battery 4. The vehicle comprises a module 7 for controlling the heating system configured so as to control said heating system according to at least one measurement of a temperature representative of the operation of the heat engine.

In particular, the control module comprises the elements necessary to the implementation of the management method as described. For that, the control module can comprise a computer program comprising the code means necessary to the progression of the steps of the management program. Furthermore, the control module can comprise inputs linked to sensors, in particular a battery temperature sensor, a sensor of a temperature representative of the temperature of the heat engine and at least one output capable of transmitting to the heating system instructions for the implementation or non-implementation of the heating of the power battery.

The invention claimed is:

1. A method for managing a power train of a motor vehicle including a heat engine and an electric motor electrically linked to a power battery, the method comprising:
   controlling a heating system of the power battery based on at least one measurement of a temperature representative of an operation of the heat engine, the controlling includes synchronizing a temperature rise of the power battery with a temperature rise of the heat engine such that a first optimal operating temperature associated with the heat engine and a second optimal operating temperature associated with the power battery are reached at a same time.

2. The method as claimed in claim 1, wherein the first optimal operating temperature is lower than the second optimal operating temperature.

3. The method as claimed in claim 1, further comprising:
   generating a setpoint temperature for each measurement of the temperature representative of the operation of the heat engine, wherein the controlling the heating system includes activating the heating system to make a real temperature of the power battery tend toward the generated setpoint temperature.

4. The method as claimed in claim 3, wherein the controlling includes measuring a current temperature of the power battery and determining a heating power of the heating system to be applied based on the generated setpoint temperature and the measured current temperature of the power battery.

5. The method as claimed in claim 1, wherein each measurement of the temperature representative of the operation of the heat engine includes measuring a temperature of coolant of the heat engine.

6. The method as claimed in claim 1, wherein the controlling the heating system includes taking calories from a member of the motor vehicle producing heat because of the operation of the heat engine and restoring at least a part of calories taken to the power battery.

7. The method as claimed in claim 6, wherein the taking calories and the restoring the at least the part of the calories use a thermal coupling element linking the member of the motor vehicle producing heat to the power battery.

8. The method as claimed in claim 1, wherein the controlling the heating system includes charging or discharging the power battery to provoke, by Joule effect, reheating thereof.

9. The method as claimed in claim 1, wherein the controlling the heating system includes activating resistive means internal to the power battery.

10. A motor vehicle, comprising:
   a power train including a heat engine and an electric motor linked electrically to a power battery;
   a heating system configured to heat the power battery; and
   circuitry configured to
      control the heating system based on at least one measurement of a temperature representative of an operation of the heat engine, and
      synchronize a temperature rise of the power battery with a temperature rise of the heat engine such that a first optimal operating temperature associated with the heat engine and a second optimal operating temperature associated with the power battery are reached at a same time.

11. The method as claimed in claim 4, further comprising:
calculating a desired temperature variation based on the measured temperature of the power battery and the generated setpoint temperature; and
deducing a desired heating power based the desired temperature variation and a regulation constant.

* * * * *